3,109,022
N-ARYL ANTHRANILIC ACIDS
Robert A. Scherrer, Ann Arbor, Mich., assignor to Parke,
Davis & Company, Detroit, Mich., a corporation of
Michigan
No Drawing. Filed June 23, 1960, Ser. No. 38,098
4 Claims. (Cl. 260—501)

The present invention relates to novel anthranilic acid derivatives which have useful pharmacodynamic properties and to methods for producing same. More particularly, the present invention relates to novel anthranilic acids and to salts thereof, said anthranilic acids having in free acid form the formula

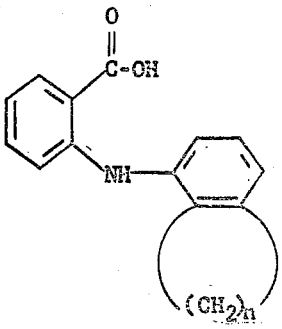

wherein $n$ represents an integer from 3 to 5 inclusive.

In accordance with the invention, the novel compounds of the above formula and their salts are produced by condensing a benzoic acid derivative of the formula

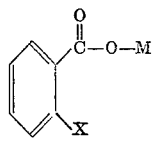

with a compound of the formula

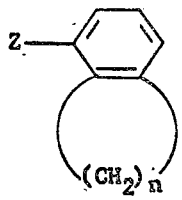

where $n$ represents an integer from 3 to 5 inclusive; M represents hydrogen or an alkali metal, preferably potassium; Y represents —$NH_2$ or halogen; and Z represents —$NH_2$ or halogen, with the added proviso that when one of Y and Z is halogen the other of Y and Z is —$NH_2$. Bromine is a preferred halogen substituent. The reaction is preferably effected in the presence of a copper-containing catalyst and a proton acceptor. In carrying out this condensation it is generally satisfactory to employ substantially equivalent quantities of the reactants in the presence of a suitable solvent. Some solvents suitable for this purpose are N,N-dimethylformamide, bis(2-methoxyethyl)ether, dimethyl sulfoxide, nitrobenzene, and lower aliphatic alcohols such as n-butanol, isoamyl alcohol and the like. Preferred solvents are N,N-dimethylformamide, and bis(2-methoxyethyl)ether. In general, the reaction is favored by temperatures in excess of 75° C. and preferably carried out in the range from 100° C. to 200° C.

Some examples of suitable copper-containing catalysts for this purpose are various forms of mechanically divided or chemically precipitated metallic copper such as e.g. powdered copper or spongy copper and various copper-containing compounds such as cuprous bromide, cuprous chloride, cupric bromide, cupric acetate, cupric carbonate, cupric oxide, cupric sulfate and the like. Cupric bromide and cupric acetate are preferred catalysts.

The quantity of the proton acceptor employed in the reaction can be varied within wide limits. In general, the proton acceptor should preferably be added in at least that amount required to bind the benzoic acid reactant and the hydrohalic acid formed in the course of the reaction. Examples of suitable proton acceptors when benzoic acid derivatives of the above formula are employed in free acid form are alkali metal carbonates, preferably potassium carbonate; cupric carbonate; cuprous carbonate and the like. When an alkali metal, and preferably potassium salt of the benzoic acid reactant is employed, calcium hydride, alkali metal carbonates such as e.g. potassium carbonate, and tertiary organic amines such as e.g. N-ethylmorpholine are examples of suitable proton acceptors.

The benzoic acid reactant is advantageously added to the reaction mixture in the form of its preformed alkali metal salt, preferably the potassium salt. Alternatively, the potassium salts of the benzoic acid reactants can be conveniently prepared in situ in a very finely divided condition by adding potassium carbonate to a boiling solution of the free acid form of the corresponding benzoic acid derivative in the solvent employed in the reaction. In the later case, it is often advantageous to remove most of the water formed in the neutralization by distilling some of the solvent prior to the addition of the catalysts and other reactant.

The compounds of the invention can also be prepared by hydrolysis of an N-acylated anthranilic acid derivative of the formula

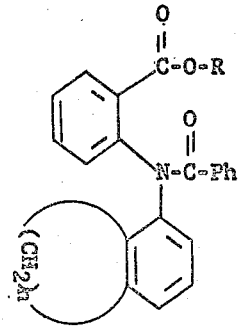

wherein R represents hydrogen or an organic radical such as e.g. lower alkyl and preferably the methyl radical; Ph represents an aryl radical, preferably phenyl or phenyl substituted by halogen, nitro, lower alkyl, or lower alkoxy groups; and $n$ has the aforementioned significance. The hydrolysis is preferably effected in an alkaline medium by dissolving the starting materials in a water-miscible inert organic solvent such as ethanol or methanol, adding a large excess of concentrated aqueous solution of sodium or potassium hydroxide and allowing the hydrolysis to proceed (with or without stirring) until the reaction is complete. The hydrolysis is favored by temperatures in excess of 75° C. and is preferably effected at temperatures ranging between 75° C. to about 150° C.

The N-acylated anthranilic acid derivatives of the above formula employed as starting materials in this process can be produced by reacting a benzimidoyl chloride of the formula

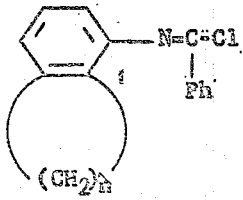

with a salicylate of the formula

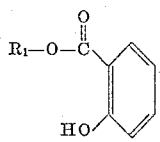

or an alkali metal salt thereof to give an imidoester of the formula

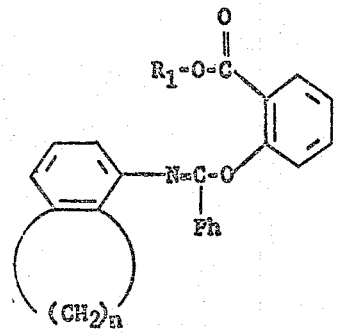

and heating said imidoester to cause an intramolecular rearrangement, optionally subjecting the reaction mixture to mild hydrolysis, preferably in a basic medium, to give the desired N-acylated anthranilic acid derivatives of the above formula. In the above formulas Ph and $n$ have the hereinbefore mentioned significance and $R_1$ represents an organic radical, preferably lower alkyl.

The novel compounds of the invention possess antipyretic and anti-inflammatory activity, have a surprisingly low degree of toxicity and are of value in mitigating the symptoms associated with rheumatic, arthritic and other inflammatory conditions. The novel anthranilic acids of the invention can be employed in free acid form or as pharmaceutically acceptable salts with a variety of pharmaceutically-acceptable inorganic or organic bases, the term "pharmaceutically-acceptable base" designating a base capable of being employed in the production of salts suitable for pharmaceutical use even though, like caustic bases and some organic amines, it is not acceptable for pharmaceutical use in and of itself. The expression "salts with pharmaceutically-acceptable bases" refers to chemical structure rather than to method of formation, and includes such salts whether formed by neutralization or other salt forming means. Some typical examples of such salts are the sodium, potassium, calcium, ammonium, choline, 2-hydroxyethylamine, bis(2-hydroxyethyl)amine, tris(2-hydroxyethyl)amine and like salts. Preferred salts are the non-toxic salts of an alkali metal, an alkaline earth metal, ammonia, or a substituted ammonia. The compounds of the invention can be combined with either a solid or liquid carrier or diluent and made available in varying amounts in such conventional vehicles as tablets, capsules, powders, aqueous and non- aqueous suspensions and solution, or any form suitable for oral administration.

The invention is illustrated, but not limited, by the following examples:

Example 1

A mixture of 20.1 g. of o-bromobenzoic acid and 20.7 g. of potassium carbonate in 50 ml. of amyl alcohol is heated until evolution of carbon dioxide ceases. 14.7 g. of 5-amino-Tetralin dissolved in 15 ml. of amyl alcohol and 0.5 g. of copper powder are then added to the reaction mixture, and the reaction mixture heated at reflux for one-half hour. The reaction mixture is then diluted with a small quantity of water and the amyl alcohol removed by steam distillation. The non-volatile aqueous fraction is acidified with concentrated hydrochloric acid and the N-(5,6,7,8-tetrahydro-1-naphthyl)anthranilic acid which separates is collected by filtration and recrystallized successively from benzene and ethanol; M.P. 187–188° C.

By substituting 13.3 g. of 4-aminoindan for the 14.7 g. of 5-amino-Tetralin in the above procedure, N-(4-indanyl)anthranilic acid is obtained.

The 5-amino-Tetralin employed in the above procedure can be prepared in the following manner: A mixture of 20.0 g. of N-acetyl-5-amino-Tetralin, 20 ml. of ethanol and 20 ml. of concentrated hydrochloric acid is refluxed overnight. The solution is made alkaline with concentrated aqueous sodium hydroxide. The 5-amino-Tetralin which separates can be used without further purification.

Example 2

A mixture of 35.2 g. of the potassium salt of anthranilic acid, 33.2 g. of 5-chloro-Tetralin, 4.5 g. of calcium hydride and 4 g. of cupric acetate in 100 ml. of dimethyl sulfoxide is heated gradually with stirring to around 150° C. and maintained between 130 and 150° C. for about 6 hours. The reaction mixture is cooled and diluted with an equal volume of water. 20 ml. of 2 N sodium hydroxide is added and the mixture extracted with several portions of ether. The ether extracts are discarded and the aqueous phase acidified with concentrated hydrochloric acid. The N-(5,6,7,8-tetrahydro-1-naphthyl)anthranilic acid which separates is collected by filtration, digested with several portions of boiling water and recrystallized successively from benzene and ethanol; M.P. 187–188° C.

By substituting 37.0 g. of 4-bromoindan for the 33.2 g. of 5-chloro-Tetralin in the above procedure, N-(4-indanyl)anthranilic acid is obtained.

Example 3

A mixture of 25.0 g. of N-(5,6,7,8-tetrahydro-1-naphthyl)-N-benzoylanthranilic acid methyl ester, 250 ml. of ethanol, 10.0 g. of sodium hydroxide and 20.0 ml. of water is refluxed for 2 hours. 150 ml. of the solvent is distilled from the reaction mixture and a solution of 60.0 g. of sodium hydroxide dissolved in 100 ml. of water is added. The hydrolysis mixture is heated an additional 2 hours and the remaining ethanol removed by distillation. The aqueous residue is acidified with concentrated hydrochloric acid and cooled. The precipitate which forms on cooling is collected by filtration and digested with several portions of boiling water. The N-(5,6,7,8-tetrahydro-1-naphthyl)anthranilic acid is recrystallized successively from benzene and ethanol; M.P. 187–188° C.

By substituting 25.0 g. of N-(4-indanyl)-N-(p-chlorobenzoyl)anthranilic acid for the 25.0 g. of N-(5,6,7,8-tetrahydro-1-naphthyl)-N-benzoylanthranilic acid methyl ester in the above procedure, N-(4-indanyl) anthranilic acid is obtained.

The N-(5,6,7,8-tetrahydro-1-naphthyl)-N-benzoylanthranilic acid methyl ester employed as starting material in the above procedure can be prepared in the following manner: 5.0 g. of 50% sodium hydride is added to a solution of 22.3 g. of methyl salicylate dissolved in 50 ml. of bis(2-methoxyethyl)ether. 26.9 g. of N-(5,6,7,8-tetrahydro-1-naphthyl)benzimidoyl chloride dissolved in 30 ml. of bis(2-methoxyethyl)ether is added and the reaction mixture heated at about 100° C. for about 6 hours. The reaction mixture is diluted with an equal volume of water and the solid precipitate which forms collected by filtration and dissolved in ether. The ethereal solution is washed with aqueous sodium chloride solution and dried over anhydrous sodium sulfate. The ether is removed by evaporation in vacuo. The crude imido ester is heated in a nitrogen atmosphere at 225-245° C. for about 2 hours and the mixture then dissolved in 250 ml. of ethanol. The ethanolic solution is decolorized with activated charcoal, filtered, and the ethanol distilled. The crude N-(5,6,7,8 - tetrahydro - 1 - naphthyl)-N-benzoylanthranilic acid methyl ester can be utilized without further purification.

Alternatively, the ethanolic solution of the rearranged imido ester can be diluted with 20 ml. of water, 5 g. of sodium hydroxide added and the reaction mixture heated at reflux for 1½ hours. The ethanol is distilled from the reaction mixture and the aqueous residue acidified with hydrochloric acid and cooled. The N-(5,6,7,8-tetrahydro-1-naphthyl)-N-benzoylanthranilic acid which separates can be utilized in the above procedure without further purification.

The N-(5,6,7,8-tetrahydro - 1 - naphthyl)benzimidoyl chloride used in the above procedure can be prepared as follows: 36.0 g. of powdered phosphorus pentachloride is added to a mixture of 25.1 g. of N-benzoyl-5-aminoTetralin in benzene and the reaction mixture heated at reflux temperature for one hour. The benzene solvent and the phosphorus oxychloride which forms in the course of the reaction are removed by distillation in vacuo. The residue is treated with a second portion of benzene and the benzene solvent distilled off. The crude N-(5,6,7,8-tetrahydro-1-naphthyl)benzimidoyl chloride which results can be used without further purification.

*Example 4*

10.0 g. of sodium carbonate is added portionwise to a suspension of 20.0 g. of N-(5,6,7,8-tetrahydro-1-naphthyl) anthranilic acid in 300 ml. of methanol heated on a steam bath. The resulting solution is filtered from the excess solid sodium carbonate and the filtrate evaporated to dryness. The sodium salt of N-(5,6,7,8-tetrahydro-1-naphthyl)anthranilic acid is ground in a mortar and dried in vacuo at 100° C. If desired, the salt may be recrystallized from a small portion of ethanol or water.

By substituting 20.0 g. of N-(4-indanyl) anthranilic acid for the 20.0 g. of N-(5,6,7,8-tetrahydro-1-naphthyl)-anthranilic acid in the above procedure, the N-(4-indanyl)-anthranilic acid sodium salt is obtained.

*Example 5*

2.65 g. of choline chloride dissolved in ethanol is added to an ethanolic solution of 5.75 g. of the sodium salt of N-(5,6,7,8-tetrahydro-1-naphthyl)anthranilic acid. The mixture is heated to about 60° C. for 5 to 10 minutes. The sodium chloride which forms in the course of the reaction is removed by filtration and the filtrate concentrated in vacuo to give the N-(5,6,7,8-tetrahydro-1-naphthyl)anthranilic acid choline salt.

By substituting 5.5 g. of the sodium salt of N-(4-indanyl)anthranilic acid for the 5.75 g. of the sodium salt of N-(5,6,7,8-tetrahydro-1-naphthyl)anthranilic acid in the above procedure, the N-(4-indanyl)anthranilic acid choline salt is obtained.

What is claimed is:
1. A compound selected from the group consisting of N-(5,6,7,8-tetrahydro - 1 - naphthyl)anthranilic acid and salts thereof with pharmaceutically-acceptable bases.
2. N-(5,6,7,8-tetrahydro-1-naphthyl)anthranilic acid.
3. N-(5,6,7,8-tetrahydro - 1 - naphthyl)anthranilic acid sodium salt.
4. N-(5,6,7,8-tetrahydro - 1 - naphthyl)anthranilic acid choline salt.

References Cited in the file of this patent
UNITED STATES PATENTS

| | | |
|---|---|---|
| 2,003,842 | Spiegler | June 4, 1935 |
| 2,479,662 | Albertson | Aug. 23, 1949 |
| 2,553,914 | Goldberg | May 22, 1951 |
| 2,889,328 | Sherlock et al. | June 2, 1959 |

OTHER REFERENCES

Goldberg et al.: Quarterly Journal of Pharmacy and Pharmacology, v. 21, pp. 10–16, 1947.
Plant et al.: J.C.S., part 2, pp. 1278–1283, 1955.
Beilstein: vol. XIV, 2nd supp. (1951), p. 215; vol. XIV (1931), p. 331.